Oct. 13, 1953      G. K. J. BROBERG      2,655,093
DEFLECTOR FOR VENTILATING GRILLS
Filed May 16, 1951      2 Sheets-Sheet 2
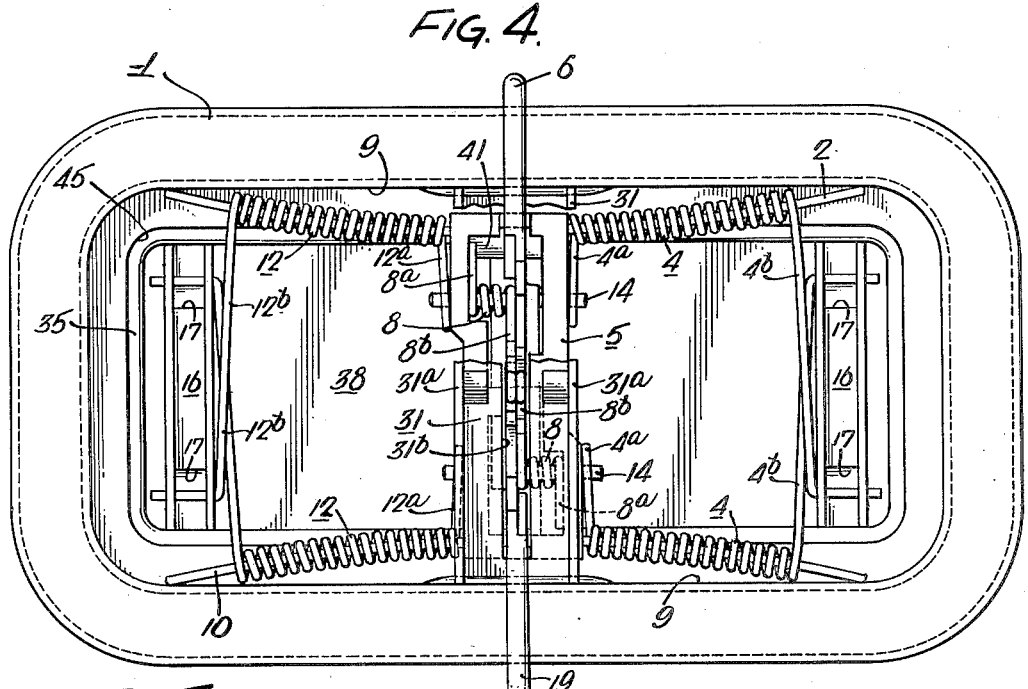
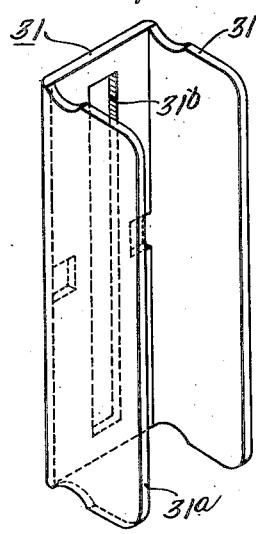
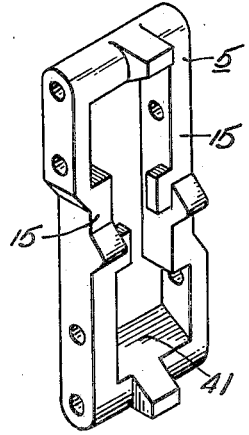
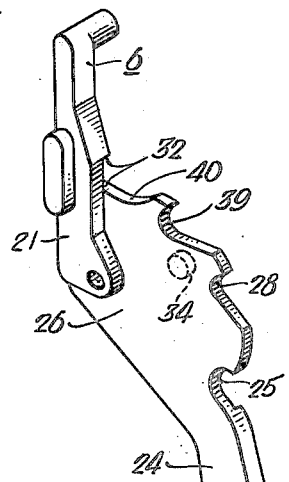
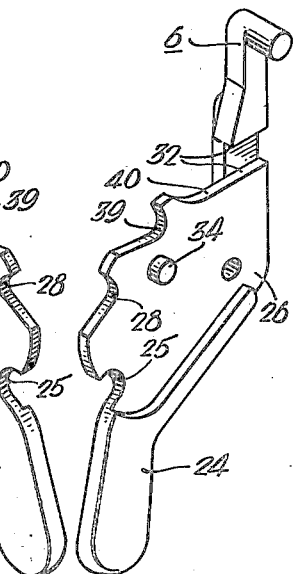
INVENTOR
GEORG KARL JOHAN BROBERG
BY HIS ATTORNEYS
Howson & Howson Patented Oct. 13, 1953

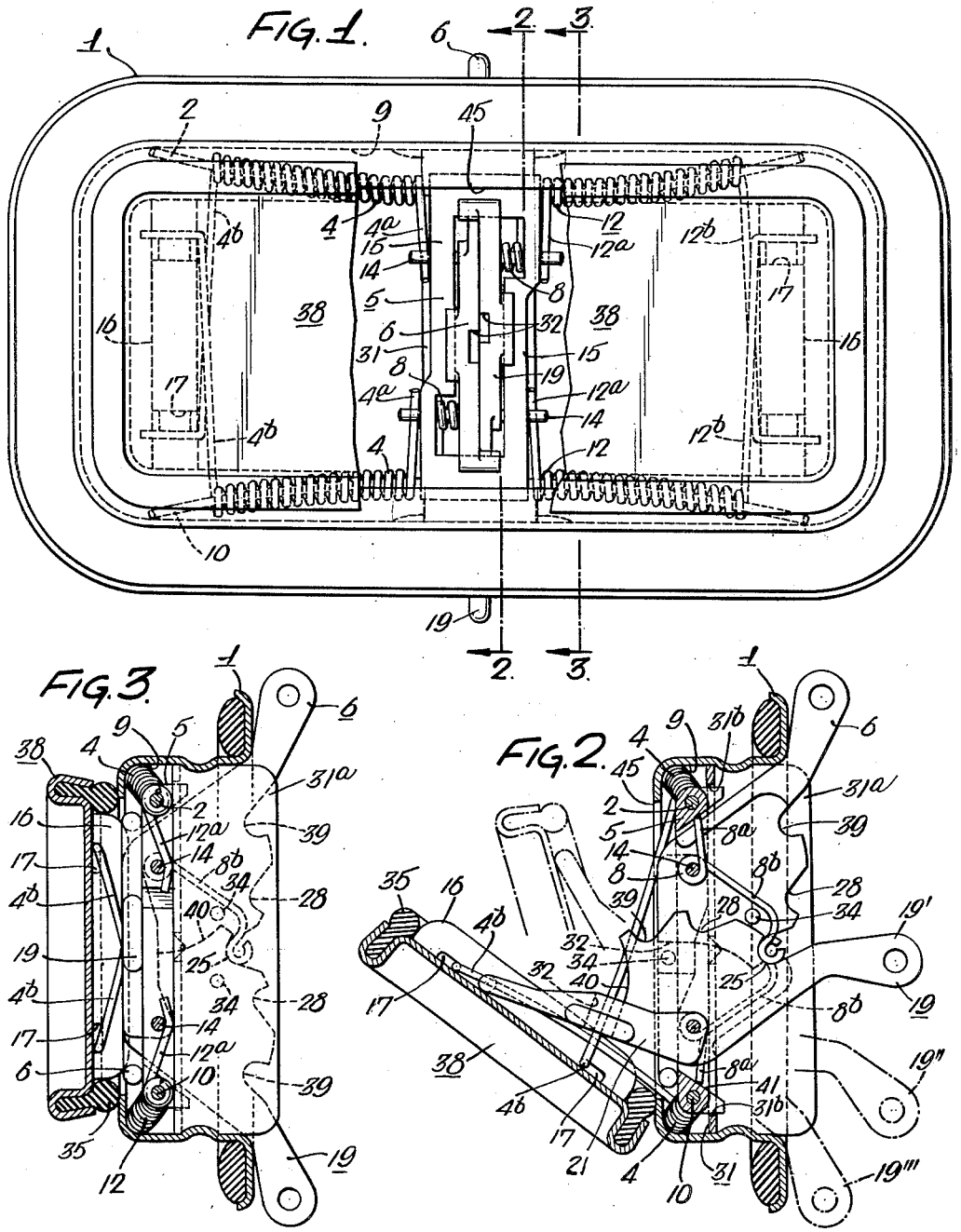

2,655,093

UNITED STATES PATENT OFFICE 2,655,093

DEFLECTOR FOR VENTILATING GRILLS

Georg Karl Johan Broberg, Solna, Sweden, assignor to A B Svenska Flaktfabriken, Stockholm, Sweden Application May 16, 1951, Serial No. 226,584
In Sweden May 11, 1950

5 Claims. (Cl. 98—41)

The present invention relates to new and useful improvements in adjusting devices for ventilating grill deflectors and more particularly for apparatus for adjusting the relative position of deflectors on ventilating grills to permit the air passing through the ventilator to be directed upward, downward or horizontally.

Prior to the present invention ventilating grills usually have been provided solely with means for controlling the flow of air through the grill. In a ventilating system, however, there is also the need of directing the air entering the grill toward different portions of the room in order to obtain the desired flow or movement of air in the room.

The principal object of the present invention is to provide a novel ventilating grill deflector which permits the control of both the volume and direction of flow of air through a grill. This is accomplished in the present invention by providing a deflector adjacent the rear surface of a grill opening and means for maintaining the deflector in any desired angular position. The apparatus for positioning the deflector comprises a frame positioned across the grill opening and a pair of adjusting levers each rotatably mounted in the frame. The adjusting levers are provided with angularly disposed arms projecting outwardly from an intermediate body portion to pivot the deflectors upwardly or downwardly, and a plurality of spring members interconnect the frame and the deflectors to resiliently maintain the deflectors in their adjusted position.

Other objects of the present invention and the various features and details of the operation and construction thereof are hereinafter more fully set forth and described with reference to the accompanying drawings, in which:

Fig. 1 is a front elevational view of a ventilating grill and deflector made in accordance with the present invention with the deflector partially broken away illustrating the means for adjusting the position of the deflector;

Fig. 2 is a transverse sectional view of the apparatus illustrated in Fig. 1 illustrating the deflector in an open position;

Fig. 3 is a transverse sectional view taken on line 3—3, Fig. 1;

Fig. 4 is a rear elevational view of the apparatus illustrated in Fig. 1 with the clamp for securing the deflector operating means in the grill partially broken away;

Fig. 5 is a perspective view of the clamp which secures the operating mechanism for the deflector in the grill;

Fig. 6 is a perspective view of the frame member for mounting the deflector operating levers; and Figs. 7 and 8 are perspective views of opposite sides of the deflector operating members.

Referring more specifically to the drawings, and particularly Fig. 1, reference numeral 1 designates generally a grill having an enlarged rectangular opening 45 therein through which air may pass. A deflector or closing member 38, corresponding to the shape of the grill opening, is mounted on the grill outwardly adjacent the grill opening and may be pivoted about its upper and lower edges by manual actuating adjusting levers 6 and 19, respectively, to control the volume and direction of flow of the air in either direction through the grill opening. The adjusting levers 6 and 19 are mounted for pivotal movement about spaced parallel shafts 14, 14 extending entirely through and carried by a frame 5. The frame 5 in turn is supported by upper and lower resilient frame wires 2 and 10 respectively which extend through openings at opposite sides of the frame 5 and have their opposite end portions bearing against the inner surface of horizontal lip portions 9 of the grill 1, as illustrated in dotted lines in Fig. 1. The frame wires are secured to the frame 5, for example, by welding or by being inserted in the mold in which the frame 5 is cast.

The frame 5 and the frame wires 2 and 10 are secured in their forward position in the grill opening by a member 31 having a generally U-shaped cross-sectional shape as shown in Fig. 5. The member 31 is positioned vertically of the grill opening 45 rearwardly adjacent the frame 5 with the central portion of the member in engagement with the rear surface of the frame 5 and the leg portions 31a, 31a projecting rearwardly therefrom. The upper and lower surfaces of the leg portions engage and securely grip the grill 1, for example, as shown in Figs. 2 and 3 and prevent displacement of the member 31 with respect to the grill. An opening 31b is provided in the body portion of the member 31 through which the operating parts of the mechanism for adjusting the position of the deflector project.

The deflector member is resiliently biased toward the grill by means of two pairs of helical torsion springs 4, 4 and 12, 12 wound around the frame wires 2 and 10, respectively. The pair of helical torsion springs 4 have their inner end portions 4a positioned in engagement with the extreme end portions of the shafts 14, 14 while the outer end portions 4b extend entirely across the grill opening and are engaged in slots 17 formed in a fastening rail 16 mounted on the deflector 38, as illustrated in Figs. 2 and 3. In a similar manner the helical torsion springs 12 have their inner ends 12a bearing against the shafts 14 while the outer ends 12b are engaged in slots 17 formed in a fastening rail 16 secured to the deflector 38 at the opposite side of the frame 5 from said first mentioned fastening rail. By this construction the extreme outer ends of the torsion springs 4, 4 and 12, 12 normally urge both the upper and lower surfaces of the deflector member 38 toward the grill 1 and cause a gasket member 35 mounted about the peripheral edge of the deflector 38 to engage the grill and prevent passage of air therethrough.

With reference to Figs. 1, 4 and 6, a central opening is provided in the frame 5 between side walls 15, 15 of the frame and the adjusting levers 6 and 19 are pivotally mounted in the frame opening on the shafts 14, 14 for movement to predetermined positions. Each adjusting lever comprises a pair of angularly disposed arms 24 and 21 which extend outwardly from a central body portion 26. The arms 21 of the adjusting levers 6 and 19 engage opposite sides of the deflector 38 while the arms 24 extend inwardly of the grill for manual actuation. As the inner arm 24 of the lever 19 is manually pivoted in the counterclockwise direction with respect to Fig. 2, the deflector 38 is pivoted outwardly about its lower edge, for example, as illustrated in Fig. 2. The upper torsion spring of each pair of torsion springs 4, 4 and 12, 12 resiliently urges the lower edge of the deflector into engagement with the grill 1. In a similar manner, when the arm 24 of the adjusting lever 6 is pivoted in the clockwise direction, with respect to Fig. 2, the deflector 38 is pivoted outwardly about the upper edge of the deflector and the lower torsion spring of each pair of springs resiliently urges the upper edge of the deflector into engagement with the grill.

An important feature of the present invention is the provision of means to maintain the adjusting levers 6 and 19 in the position to which they are actuated. To this end a plurality of recesses 25, 28 and 39 are provided on the upper surface of the body portion of each adjusting lever, as illustrated in Figs. 7 and 8, and a pair of helical springs 8, 8 are provided which are selectively engaged in the recesses 25, 28 and 39 and maintain the adjusting levers in their set position. Each helical spring 8 has an arm portion 8a which engages against a portion 41 of a frame 5 and a second arm portion 8b which engages the upper surface of the levers 6 and 19. In the closed position of the deflector the spring arms 8b are engaged in the recesses 25 of the adjusting levers 6 and 19. Actuating one of the adjusting levers to an intermediate position will cause the spring arm 8b associated with that adjusting lever to engage the intermediate recess 28 and maintain the adjusting lever in the intermediate position. Similarly, upon actuation of the adjusting lever to the extreme open position the spring arm 8b will engage in the recess 39 and maintain the adjusting lever in position. The body portions 26 of the adjusting levers are thinner than the arm portions so the adjusting levers may be nested within each other thereby decreasing the over-all width of the frame 5 and the arm portions 8b, 8b of the helical springs 8, 8 positioned adjacent the upper surface of the body portion of each adjusting lever.

Another important feature of the present invention is the provision of a lug 34 on each adjusting lever 6 and 19 which prevents movement of one adjusting lever when the other lever is in an open or partly open position. Upon actuation of one of the adjusting levers to an open or partly open position the lug 34 on that lever is projected to a position adjacent the forward surface 40 of the opposite adjusting lever thereby preventing rotary movement of the opposite lever. A shallow recess 32 is provided in each of the arms 21, 21 of the levers 6 and 19 and the recess 32 of each lever receives the lug 34 of the other lever when the other lever is actuated to its fully open position.

The operation of the adjusting levers and deflector is best illustrated in Fig. 2 of the drawings. In Fig. 2 of the drawings the operating lever 19 is illustrated in full lines at 19' in one extreme limit position wherein the deflector 38 is actuated to its fully open position and pivoted about its lower edge. In this position air may pass through the grill opening substantially horizontal from the front or the rear thereof depending on how the grill is mounted in the wall of the space being ventilated. Actuation of the operating lever 19 to its intermediate position as shown in dotted lines at 19'' will move the deflector to its partly open position as shown in dotted lines and air will pass through the grill opening parallel to the face of the deflector. Upon actuation of the operating lever to its extreme limit position, as indicated in broken lines at 19''', the deflector is in its closed position. In a like manner the operating lever 6 may be moved to positions similar to those assumed by the operating lever 19 and will pivot the deflector 38 about its upper edge.

From the foregoing it will be observed that the present invention provides a novel ventilating grill and deflector which will control both the volume and direction of flow of air through the grill and which is of relatively simplified construction.

While a particular embodiment of the present invention has been illustrated and described herein it is not intended to limit the invention to such a disclosure and changes and modifications may be incorporated and embodied therein within the scope of the following claims.

What I claim is:

1. In apparatus for adjusting ventilating grill deflectors comprising a grill having an enlarged opening therein and a deflector mounted over said grill opening for pivotal movement about an edge portion thereof relative to said grill, a frame, means resiliently mounting said frame crosswise of said grill opening, spring members supported by said mounting means and engaging said deflector and said frame operable to resiliently urge the same against said grill, and an adjusting lever pivotally mounted on said frame and bearing against said deflector, said adjusting lever being operable upon pivotal movement thereof to pivot said deflector about said edge portion relative to the grill.

2. In apparatus for adjusting ventilating grill deflectors comprising a grill having an enlarged opening therein and a deflector mounted over said grill opening for pivotal movement about an edge portion thereof relative to said grill, a frame, means resiliently mounting said frame crosswise of said grill opening, a plurality of spring members supported by said mounting means and engaging said deflector and said frame operable to resiliently urge the same against said grill, an adjusting lever pivotally mounted on said frame and bearing against said deflector for pivotal movement to a plurality of predetermined positions, said adjusting lever being operable upon pivotal movement thereof to pivot said deflector about said edge portion relative to the grill, and means including a member mounted in engagement with said adjusting lever to resiliently maintain said lever in the position to which adjusted.

3. In apparatus for adjusting ventilating grill deflectors comprising a grill having an enlarged opening therein and a deflector mounted over said grill opening for pivotal movement about its opposite edge portions relative to said grill, a frame positioned across said grill opening, a pair of resilient members extending outwardly from opposite sides of said frame in engagement with the grill to resiliently support said frame crosswise of said grill opening, oppositely disposed pairs of torsion springs carried by said members in engagement with said deflector and said frame operable to resiliently urge the same against said grill, and a pair of adjusting levers pivotally mounted in said frame, said adjusting levers each having a portion thereof positioned in engagement with said deflector, one of said adjusting levers being operable when actuated to pivot the deflector about one of said edge portions and the other of said adjusting levers being operable when actuated to pivot the deflector about the other of said edge portions.

4. In apparatus for adjusting ventilating grill deflectors comprising a grill having an enlarged opening therein and a deflector mounted over said grill opening for pivotal movement about its opposite edge portions relative to said grill, a frame positioned across said grill opening, a frame positioned across said grill opening, a pair of resilient members extending outwardly from opposite sides of said frame in engagement with the grill to resiliently support said frame crosswise of said grill opening, oppositely disposed pairs of torsion springs carried by said members in engagement with said deflector and said frame operable to resiliently urge the same against said grill, a pair of adjusting levers pivotally mounted in said frame for movement to predetermined positions, said adjusting levers each having a portion thereof positioned in engagement with said deflector, one of said adjusting levers being operable when actuated to pivot the deflector about one of said edge portions and the other of said adjusting levers being operable when actuated to pivot the deflector about the other of said edge portions, and means including a member mounted in engagement with said adjusting levers to resiliently maintain said levers in the position to which adjusted.

5. In apparatus for adjusting ventilating grill deflectors comprising a grill having an enlarged opening therein and a deflector mounted across said grill opening for pivotal movement about its opposite edge portions relative to the grill, a frame positioned across said grill opening, a pair of resilient members extending outwardly from opposite sides of said frame in engagement with said grill to resiliently support said frame across said grill opening, pairs of oppositely disposed torsion springs carried by said members extending across said grill opening and engaging said deflector and said frame operable to resiliently urge the same into engagement with said grill, a pair of adjusting levers pivotally mounted at opposite sides of said frame selectively operable for pivotal movement from a closed position of the deflector to predetermined open and partly open positions, each of said adjusting levers having a portion thereof extending across said grill opening and engaging said deflector to pivot said deflector upon pivotal movement of the levers, means including a lug on each of said adjusting levers operable when one of said adjusting levers is actuated from its closed position to engage the other adjusting lever and maintain the same in its closed position, and a resilient member in engagement with each of said adjusting levers operable to maintain said adjusting levers in the position to which adjusted.

GEORG KARL JOHAN BROBERG.

References Cited in the file of this patent

UNITED STATES PATENTS

| Number | Name | Date |
|---|---|---|
| 1,937,952 | Galamb | Dec. 5, 1933 |

FOREIGN PATENTS

| Number | Country | Date |
|---|---|---|
| 433,896 | Great Britain | Aug. 22, 1935 |